(12) United States Patent
McCarthy et al.

(10) Patent No.: US 8,995,668 B2
(45) Date of Patent: *Mar. 31, 2015

(54) PRIVACY MANAGEMENT FOR TRACKED DEVICES

(71) Applicant: Absolute Software Corporation, Vancouver (CA)

(72) Inventors: Charles Chad McCarthy, Vancouver (CA); Damien Gerard Loveland, Richmond (CA); Trevor Wiebe, Vancouver (CA)

(73) Assignee: Absolute Software Corporation, Vancouver, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,227

(22) Filed: Dec. 12, 2013

(65) Prior Publication Data

US 2014/0164766 A1 Jun. 12, 2014

Related U.S. Application Data

(63) Continuation of application No. 12/505,425, filed on Jul. 17, 2009, now Pat. No. 8,625,799.

(60) Provisional application No. 61/082,130, filed on Jul. 18, 2008.

(51) Int. Cl.
*H04L 9/00* (2006.01)
*G06F 17/00* (2006.01)
(Continued)

(52) U.S. Cl.
CPC .......... *G06F 21/6272* (2013.01); *G06F 21/552* (2013.01); *H04L 63/0442* (2013.01); *H04W 4/20* (2013.01); *H04W 12/02* (2013.01); *H04W 12/12* (2013.01); *H04L 9/08* (2013.01); *H04L 9/30* (2013.01); *G06F 2221/2101* (2013.01);
(Continued)

(58) Field of Classification Search
CPC ...... H04L 63/0442; H04L 9/08; H04L 63/045
USPC .......... 713/165, 176; 726/11, 1; 380/259, 277
See application file for complete search history.

(56) References Cited

U.S. PATENT DOCUMENTS 6,700,493 B1 3/2004 Robinson
7,023,356 B2 4/2006 Burkhardt et al.
(Continued)

OTHER PUBLICATIONS

PCT/CA2009/001028, PCT International Search Report, Sep. 22, 2009 (of-record in the parent application).
(Continued)

*Primary Examiner* — Abu Sholeman
(74) *Attorney, Agent, or Firm* — Knobbe, Martens, Olson & Bear, LLP

(57) ABSTRACT

A system is disclosed that protects private data of users while permitting the monitoring or tracking of electronic devices that are shared for both business and private purposes. The electronic devices may be configured to selectively encrypt location data, and/or other types of data, before such data is transmitted to a monitoring center. For example, data collected or generated on a user device outside of work hours may be encrypted with a private key of the device's user prior to transmission to the monitoring center, so that the data is not accessible to the employer. Data collected or generated during work hours may be transmitted without such encryption.

16 Claims, 3 Drawing Sheets

(51) Int. Cl.
  *G06F 21/62* (2013.01)
  *G06F 21/55* (2013.01)
  *H04L 29/06* (2006.01)
  *H04W 4/20* (2009.01)
  *H04W 12/02* (2009.01)
  *H04W 12/12* (2009.01)
  *H04L 9/08* (2006.01)
  *H04L 9/30* (2006.01)
  *H04W 4/02* (2009.01)
  *H04W 88/02* (2009.01)

(52) U.S. Cl.
  CPC . *G06F2221/2107* (2013.01); *G06F 2221/2109* (2013.01); *G06F 2221/2111* (2013.01); *G06F 2221/2115* (2013.01); *G06F 2221/2119* (2013.01); *G06F 2221/2151* (2013.01); *H04W 4/02* (2013.01); *H04W 88/02* (2013.01); *H04L 2209/80* (2013.01)
  USPC .............................................. 380/277; 726/1

(56) References Cited

U.S. PATENT DOCUMENTS

| | | | |
|---|---|---|---|
| 7,058,814 B1 | 6/2006 | Zimmerman | |
| 7,543,317 B2 | 6/2009 | Kahn et al. | |
| 7,916,870 B2* | 3/2011 | Mergen | 380/278 |
| 8,213,905 B2* | 7/2012 | Yang | 455/411 |
| 8,806,602 B2* | 8/2014 | Radhakrishnan | 726/9 |
| 2001/0050990 A1* | 12/2001 | Sudia | 380/286 |
| 2002/0129238 A1 | 9/2002 | Toh et al. | |
| 2004/0087314 A1 | 5/2004 | Duncan | |
| 2004/0106415 A1 | 6/2004 | Maeda et al. | |
| 2004/0172550 A1 | 9/2004 | Sai | |
| 2006/0041903 A1* | 2/2006 | Kahn et al. | 725/28 |
| 2006/0150252 A1 | 7/2006 | Okimoto et al. | |
| 2006/0233360 A1 | 10/2006 | Gammel et al. | |
| 2007/0006322 A1* | 1/2007 | Karimzadeh et al. | 726/27 |
| 2007/0024500 A1 | 2/2007 | Glennon et al. | |
| 2007/0079117 A1* | 4/2007 | Bhogal et al. | 713/160 |
| 2007/0136814 A1* | 6/2007 | Lee et al. | 726/25 |
| 2007/0178909 A1 | 8/2007 | Doyle | |
| 2007/0229350 A1 | 10/2007 | Scalisi et al. | |
| 2007/0271348 A1 | 11/2007 | Yang | |
| 2008/0072284 A1 | 3/2008 | Horvitz et al. | |
| 2008/0162225 A1* | 7/2008 | Malcolm | 705/7 |
| 2008/0177994 A1 | 7/2008 | Mayer | |
| 2008/0270789 A1* | 10/2008 | Bandini et al. | 713/156 |
| 2008/0310633 A1* | 12/2008 | Brown et al. | 380/259 |
| 2009/0117877 A1* | 5/2009 | Yang | 455/411 |
| 2009/0132713 A1 | 5/2009 | Dutta et al. | |
| 2009/0254997 A1* | 10/2009 | Yassa | 726/27 |
| 2009/0271617 A1 | 10/2009 | Song et al. | |
| 2010/0122326 A1* | 5/2010 | Bisbee et al. | 726/5 |
| 2010/0313013 A1* | 12/2010 | Ginter et al. | 713/155 |
| 2011/0231840 A1* | 9/2011 | Burch et al. | 718/1 |
| 2011/0231914 A1* | 9/2011 | Hung | 726/7 |
| 2012/0005474 A1* | 1/2012 | Bourret et al. | 713/150 |
| 2013/0124233 A1* | 5/2013 | Walker et al. | 705/4 |
| 2013/0144976 A1* | 6/2013 | Tedesco et al. | 709/217 |
| 2013/0237142 A1* | 9/2013 | Brisebois et al. | 455/1 |
| 2014/0143889 A1* | 5/2014 | Ginter et al. | 726/27 |

OTHER PUBLICATIONS

PCT/CA2009/001028, PCT Written Opinion of the International Searching Authority, Sep. 22, 2009 (of-record in the parent application).

Gruteser M., et al. "Protecting Privacy in Continuous Location-Tracking Applications," IEEE Security and Privacy, vol. 2, No. 2, Mar. 1, 2004 (of-record in the parent application).

Sun Y., et al. "An Architecture and Key Management Approach for Maintaining Privacy in Location Based Group Services," International Conference on Collaborative Computing, Dec. 19, 2005 (of-record in the parent application).

Supplementary European Search Report and Search Opinion, dated Jul. 6, 2011, in European Patent Appl. No. EP 09 79 7334 of Absolute Software Corporation (of-record in the parent application).

Sun, et al., an architecture and key management approach for maintaining privacy in location based group services 2005, IEEE (of-record in the parent application).

* cited by examiner

PRIVACY MANAGEMENT FOR TRACKED DEVICES

CROSS-REFERENCE TO RELATED APPLICATIONS

This application is a continuation of U.S. application Ser. No. 12/505,425, filed Jul. 17, 2009, which claims the benefit of U.S. Provisional Patent Appl. No. 61/082,130 filed Jul. 18, 2008, which is hereby fully incorporated by reference.

BACKGROUND

The present disclosure relates to the protection of user privacy while allowing electronic devices to be tracked.

Laptops, and increasingly other electronic devices such as cell phones, PDAs, smart phones (e.g. BlackBerry™, iPhone™), memory sticks, personal media devices (e.g. iPod™), gaming devices and personal computers, are being remotely tracked so that they can be recovered in the event of theft. Such tracking may be effected by sending location information to a remote storage site or an email server.

Proprietary information is routinely stored on electronic devices such as personal computers, laptop computers and personal digital assistants, and the need to protect such proprietary or sensitive data, and to recover such devices if they are lost or stolen, is self-evident. However, the privacy of the users of such devices needs to be taken into consideration when providing protection of such devices and/or data.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below.

In many cases, an employer will want to track all the laptops (or other electronic devices) that are issued to its employees. For privacy reasons, some employees may object to the laptop being tracked 24/7, as one's personal location and compilations of historical personal locations are considered private data. This is especially the case if an employer has given permission for an employee to use the laptop for personal use outside of working hours. The concern exists whether the employer does the monitoring, or whether an unrelated third party such as a security company does the monitoring.

The subject matter described herein provides a system and method for the conditional encryption of data transferred from a device that is being tracked to a computer at a remote location. Data transfer may be for tracking, for monitoring purposes, data backup or for recovery in the case of loss or theft.

There are several aspects to the encryption in one embodiment. In order to prevent unauthorized access, private data is encrypted before it is transferred to the remote location, and cannot be decrypted without a private key. Whether or not data is encrypted before transmitting to the remote location may depend on whether it is private or business data, the determination of which can be made dependent upon certain conditions. The conditions may be temporal, such that for data created during certain hours of the day (such as working hours), the data is considered to be business related and is not encrypted before transfer, or it is pre-encrypted and decryptable at the remote site using a business related decryption key. For data created at other times, such as outside working hours, the data may be considered private and encrypted before transfer. In a preferred embodiment, private data is decryptable only with consent of the user of the device, using a private decryption key.

The data that is transferred is typically location or location-related information, such as IP addresses, GPS coordinates, Wi-Fi signal strengths, cell tower signal strengths, times at these locations, time spent at these locations, and identification indicia for the device, but may also include websites visited, key strokes, email messages, software versions, software run, device specifications, mouse movements and files or details of files created, deleted, copied, transferred, opened, clicked, selected and/or amended. However, as will be readily understood by those of skill in the art, the disclosed subject matter can equally be employed to protect other private data created using a shared business and private use device, either together with location or location-related information, or alone. Other private data that can be protected includes, for example, usage data, websites visited, video and audio files played, downloads, keystrokes, screenshots, emails, files and any other private data.

DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

A. Terminology

Figure 1:
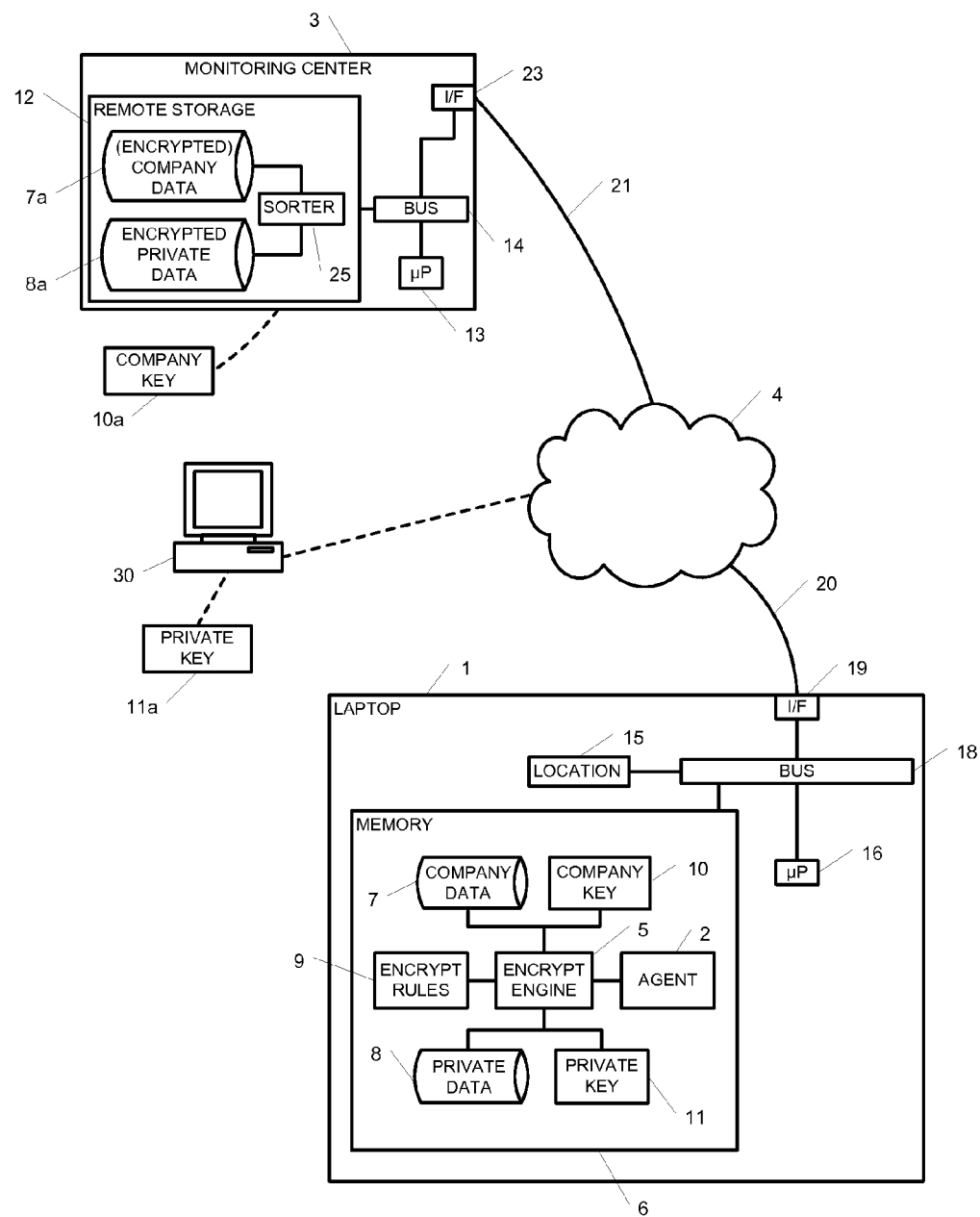
FIG. 1 is a schematic functional block diagram of a system and method for the conditional encryption of data in accordance with an embodiment of the disclosed subject matter, as incorporated in a laptop computer.

Agent—as used herein, is a software, hardware or firmware agent that is ideally persistent and stealthy, and that resides in a computer or other electronic device. The agent preferably provides servicing functions which require communication with a remote server. The agent is tamper resistant and may be enabled for supporting and/or providing various services such as data delete, firewall protection, data encryption, location tracking, message notification, and software deployment and updates. An illustrative embodiment of an agent is found in the commercially available product Computrace Agent™. The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; and 6,507,914 and related foreign patents. Details of the persistent function of an agent are disclosed in U.S. Patent Application Publication Nos. US2005/0216757 and US2006/0272020. The technical disclosures of these documents are fully incorporated by reference as if fully set forth herein. It is feasible to use an equivalent agent to the Computrace Agent™, or less preferably an alternative agent with less functionality. For the purposes of the present disclosure, the minimal functional attribute of the agent is to facilitate communications between the electronic device and a monitoring center. Communications may be initiated by the agent, by the monitoring center or by both.

Host—This is the electronic device to be protected, that is typically intended for shared business and private use. Examples of a host include a laptop, a netbook, or a smart phone. The agent resides in the host.

Monitoring Center—This is a guardian server or other computer or server that the agent communicates with or sends a message to. It may be an email server or it may be a distribution of servers or other computers. For example, provided an internet connection is available to the host, an agent may call the monitoring center at some selected suitable interval to report the location of the host, download software upgrades if there are any and repair any security modules that are or should be installed on the host. In the embodiments disclosed herein, the agent would upload to remote storage located in the monitoring center location information and/or any other data desired to be transferred. Communication to the monitoring center may take place, for example, via a wired or wireless telephone network, WIFI, WIMAX, cable or satellite.

Encryption—It is generally assumed that any data that is transferred between remote devices, such as between a host and a monitoring center, is encrypted during transmission. However, in this document, unless the context requires otherwise, the term encryption generally refers to a conditional level of encryption, which may be private encryption or business encryption, rather than to the encryption typically employed during transmission. Furthermore, the term encryption applies predominantly herein to private data (including private location information and/or any other private data desired to be transferred) that is transferred and remains encrypted and unable to be decrypted at a remote storage center unless a private decryption key is provided. The term encryption also refers to the user of a host device, who is the owner of private data, being able to control whether his private data is encrypted when it is transferred or copied to a remote storage facility. Private data can also be referred to as personal data. Business data can also be referred to as corporate data, company data or non-personal data.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. In general, unless otherwise indicated, singular elements may be in the plural and vice versa with no loss of generality. The use of the masculine can refer to masculine, feminine or both.

B. Exemplary Embodiment

A block diagram of a preferred embodiment is shown in FIG. 1. A host electronic device 1 such as a laptop comprises an agent 2 which can communicate regularly, aperiodically, randomly, semi-randomly and/or according to triggers, with remote storage 12 at a monitoring center 3 via the internet 4, via some other telecommunications network, or via a combination of these. SMS messaging can be used for all or some of the communications, for example.

The agent 2 is operably connected to an encryption engine 5 comprising computer readable instructions in the memory 6, which encrypts the company data 7 and/or private data 8 to be transferred, according to encryption rules 9, also stored in memory 6. One or more encryption keys, for example company key 10 and private key 11, may be stored in the memory 6 of the electronic device 1. The memory 6 may be divided into parts and/or different types of memory, such as, for example, to facilitate the separate storage of company data 7 and private data 8 in distinct data stores. In a typical application, a user of device 1 may create a private directory or folder in memory 6 into which any data that is identified as private data 8 may be segregated from company data 7.

Host device 1 also comprises a location device 15, such as a GPS or A-GPS receiver device, or some other device performing location determination. The location device 15 may be contained in the memory 6 of the electronic device 1, or it may be a component or module separate from the memory 6 as shown in FIG. 1. There may be one, two or more location devices 15, each operating on a different principle or one acting as a backup for another. The electronic device 1 generally contains a processor 16 for processing instructions contained in the memory 6 and reading/writing data to and from it via a bus 18, and an interface 19 to the internet 4 or other communication network. It should be appreciated that a device 1 that connects to the internet 4 may in some cases be considered part of the internet 4.

The agent 2 sends data 7, 8, which may include location information, to a monitoring center 3 and/or remote storage device(s) 12 regularly, aperiodically, randomly, semi-randomly and/or according to triggers. This transmission of data between agent 2 and monitoring center 3 may occur transparently to the user. Before sending, private location data (i.e. location data logged or collected outside working hours) in private data store 8 may be encrypted and company location data in company data store 7 may be left unencrypted. Location data in data stores 7, 8 may be present only transiently in the electronic device 1.

At the monitoring center 3, the two types of data 7a, 8a may be stored together, or may be stored in separate databases after being sorted by a sorter module 25. For example, the company data 7 that is not encrypted can be marked as such in device 1, or can be identified as such at the monitoring center 3, and then stored in data store 7a. Private data 8 that is encrypted before sending can be marked as such in device 1, or can be identified as such at the monitoring center 3, and then stored in a data store 8a. The remote storage 12 may be at the premises of a company or business that owns the electronic device 1, or at the premises of a third party security company, or it may be in another computer or server, or distributed in multiple computers or servers. If the company data 7a that is stored is not encrypted (apart from temporarily during transmission), the company will have access to it, but will not be able to decipher private data 8a without being provided access to private decryption key 11a. It is possible that the encryption engine 5 encrypts both company data 7 and private data 8 before it is sent by the agent 2 to the remote storage 12, in which case an administrator at the company will need a company decryption key 10a to convert the data 7a to a meaningful (unencrypted) format. In either case, the private data 8 which is transferred or copied is encrypted using a private encryption key 11 or password that is known only to the user of the electronic device 1. The company does not have access to the private encryption key 11 and cannot interpret the data 8a that is private and stored at the monitoring center 3.

The monitoring center 3 may be a server which contains an interface 23 to the network 4, a bus 14 via which components internal to the server communicate and a processor 13 for processing computer readable instructions in remote storage 12. Examples of instructions may be those used to sort incoming data in the sorter module 25, a program allowing for input of decryption keys, a program for allowing access to data, etc. Also in remote storage 12, the encrypted private data 8a may be stored, as can be the company data 7a, which may or may not be encrypted. Links 20, 21 between the electronic device 1, the network 4 and the monitoring center 3 may be wired, wireless or cable.

If a user wants to access his private data 8a—for example after the theft of the electronic device 1, he can access the remote storage 12 using a terminal 30 via the internet 4. The data can be downloaded to terminal 30 and the user's private decryption key 11a can be used to decrypt the data 8a. A first password may be used for retrieving the private data 8a and a second password or decryption key 11a may be used for decrypting the private data 8a. Alternately, the decryption key 11a may be provided to the monitoring center 3 in order to decrypt the private data 8a.

Figure 2:
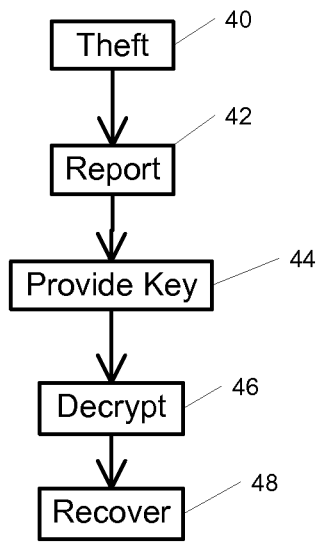
FIG. 2 is a functional flow diagram schematically representing the post-theft flow process of a system and method for the conditional encryption of data in accordance with embodiments of the disclosed subject matter.

In the case of theft or loss of the electronic device 1, FIG. 2 shows the process a user typically goes through. The theft 40 is reported 42 to the police and to the company that owns the electronic device 1, and the user provides 44 the user's decryption key 11a to the company. This may be via another computer 30 connected to the internet 4, or it may be given directly to a company administrator. This decryption key/password 11a will allow some or all of the private location information in data store 8a to be decrypted 46 by the company and/or security company, so that it can be provided to law enforcement authorities who then attempt to recover 48 the electronic device 1. The business, company and/or security company administering the monitoring of the electronic device 1 has access to company location data 7a (using a company decryption key 10a if the company data 7a has also been encrypted) and can make this information available to law enforcement. This means that the user potentially sacrifices location privacy only in the case of a theft, but not on a day to day basis or in the absence of a theft. In some embodiments, access to private location data 8a may be provided only as far back as the date and time of the theft, or as close to this as can be determined, or to the date and time the theft was reported, so that all or the majority of user location privacy is not compromised.

In embodiments where the provision of a private key would reveal historical location data, or other private information, the use of a third party security company may be preferable for employees who never want any of their private information to become available to their employer.

Figure 3:
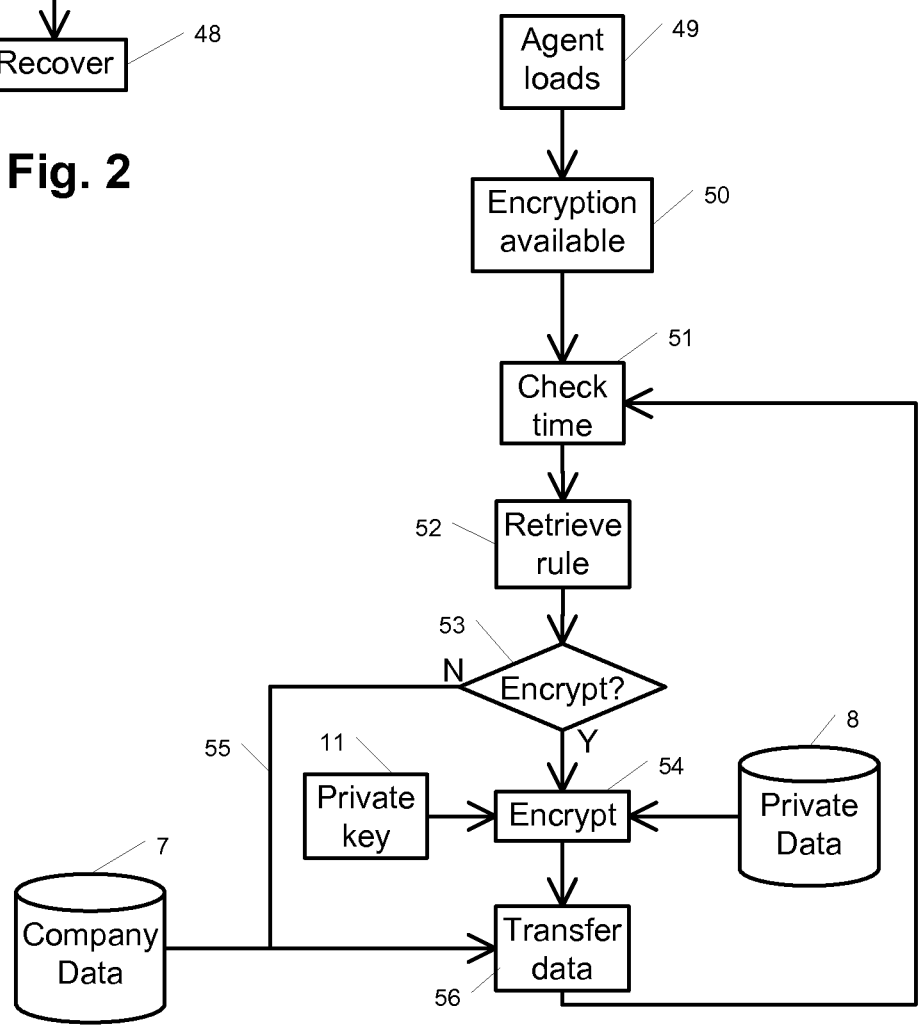
FIG. 3 is a functional flow diagram schematically representing the encryption process of a system and method for the conditional encryption of data in accordance with embodiments of the disclosed subject matter.

There may be a set of rules by which the private data 8 is encrypted. FIG. 3 shows that after the agent loads 49 it ensures the availability of the encryption engine 50. The encryption engine 5 then checks 51 the time of day and retrieves 52 an encryption rule 9 in order to determine 53 whether to encrypt the private data 8 or not. As an example only, a simple rule could be that data 7, 8 is not encrypted between the times of 9 am-5 pm, Mondays to Fridays. In this example, it is assumed that, whether the data is in fact private or business-related in nature, it will all be treated as company data 7 during working hours. During working hours, there is no encryption 55 and company data 7 (comprising all data 7,8) is transferred 56 to remote storage 12. The remote storage 12 may be located in a monitoring center 3 at the premises the user works at, or it may be at another site. After data has been transferred 56, the process loops back to the check time step 51 so that further data can be transferred from time to time, after a set delay, or after more data is created. Outside of these times, i.e. outside of the normal working hours, all data is assumed to be private data 8 and is encrypted with a private key 11 and/or password known only to the user of the electronic device 1. The private data 8 is encrypted 54 and transferred 56 to the remote storage facility 3. After data has been transferred 56, the process loops back to the check time step 51 so that further data can be transferred after a delay.

Other time periods may be set as exceptions to a schedule such as described above, and allowances may be made for vacation time, for example. Rules, including rules relating to the time periods, may be amended or updated via the agent 2 during a communication with the monitoring center. For example, in the case of a theft, an amended rule to cease all private encryption may be communicated via the agent 2 to the encryption rules module 9. This embodiment may obviate the need for a user to supply a private decryption key 11a to recovery personnel.

Business or company data 7 may be encrypted with a key 10 known only to the business, company, owner or administrator of the electronic device 1. Alternately, there may a separate encryption process for storage of company data that occurs at the remote monitoring site 3. This way, a user will not have access to a company encryption key.

Figure 4:
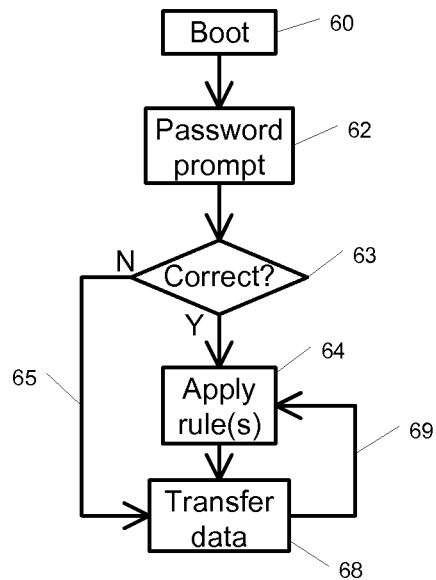
FIG. 4 is a functional flow diagram schematically representing the encryption process of a system and method for the conditional encryption of data in accordance with alternate embodiments of the disclosed subject matter.

The application of the rules 9 may in some embodiments be dependent upon the user entering a password. As shown in FIG. 4, after the electronic device boots 60, it prompts 62 the user to enter a password. If 63 the password is correctly entered, the rules 9 are applied 64 and private data 8 is encrypted according to the private encryption key 11. If 63 the password is incorrectly entered 65, or not entered, the data 8 is not encrypted according to the private key 11, because in this case, either the device 1 has been stolen, or the user wishes only to use the device for work-related tasks. Whether the data is encrypted or not, it is transferred 68 to the remote storage 3. After the transfer 68, the system loops back 69 in the process so that from time to time, regularly, or as and when needed, more data can be transmitted.

Figure 5:
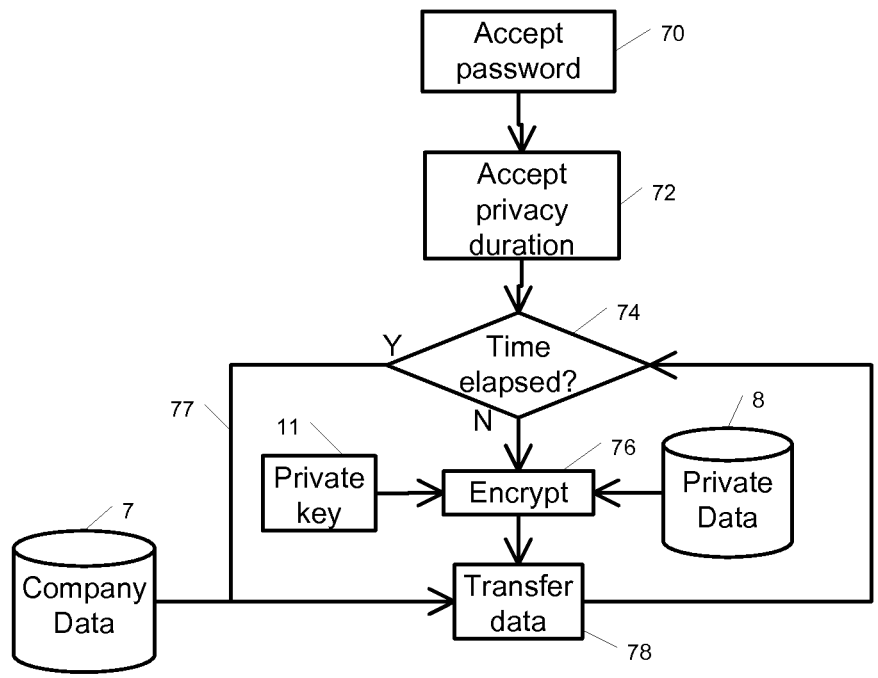
FIG. 5 is a functional flow diagram schematically representing the encryption process of a system and method for the conditional encryption of data in accordance with further alternate embodiments of the disclosed subject matter.

In an alternate embodiment, the company data 7 and the private data 8 is by default not encrypted. The user has the option, when desiring to use the device 1 for private matters, of entering a password which will cause the data that is transferred to the remote storage 12 to be encrypted beforehand, but only for a set period of time. Referring to FIG. 5, the device 1 is configured to accept 70 entry of a password. Upon entry of a correct password, the device 1 prompts the user to choose a privacy duration, which may be a selection for a set of standard periods such as 30 minutes, 6 hours and 1 week, for example. Other times are possible, and the user may have the option of entering any time up to a predetermined maximum. The device 1 accepts 72 the input of the desired privacy duration from the user and then monitors 74 whether the duration has elapsed or not. During the period selected, all data 8 is encrypted 76 using the private key 11, as it will be assumed that all use of the electronic device during this period is for private data 8. The encrypted data is then transmitted 78 to the remote storage 12. If 74 the privacy duration selected has elapsed 77, data is not encrypted using the private key, as it is assumed that data created after this duration is company data 7, which is transmitted 78 to the remote storage 12 without being encrypted (or is encrypted using company key 10). After transfer 78 of data, whether encrypted or not, the process reverts to step 74, so that from time to time a check can be made on whether the privacy duration has elapsed and more data can be transferred if necessary.

Example Rules

The following are examples of rules that can be used for the encryption using the user's private key:

1. Always encrypted. After theft, the user provides the key. This case would be suitable where location data is being recorded.
2. Always encrypted. Decryption of data is possible after both the user and the owner provide their respective parts of a joint key.
3. Encryption occurs according to a private key for time periods outside a working day.
4. As example rule (3), but this rule can be modified to allow for vacations and variable working times.
5. As example rule (3), but can only be activated if the user inputs a password at boot or unlock.
6. Encryption occurs according to a private key temporarily upon the request of a user, as in the embodiment of FIG. 5. The desired duration of privacy may be entered by the user, or it may be fixed. It may be a different period depending on the time of day. For example, around lunchtime it could be 20 minutes. In the evening, it could be 5 hours. At the weekend it may be a day.

Alternatives and Variations

Steps in the figures may be performed in a different order to that illustrated, or they may be combined where shown separately.

A signal (such as an audible signal or a visual pop-up message generated on the device) may be generated by the agent and given to the user that the period of private encryption is over, or is about to end. It may be a disguised signal that gives no clue to a thief that there is a form or tracking protection installed in the device.

A user password for encryption may be deleted by the agent from the device at the end of every encryption period. This would prevent a thief attempting to use it to encrypt location data in order to hide his whereabouts.

On provision of the user's private key to the security company, the system may be configured to only decrypt data going back for a certain period of time, such as two weeks. This could be arranged by regularly deleting old data from the remote storage device. Alternately, the private encryption key may evolve as a function of time, such that a given decryption key can only unlock current and future data but not historical data.

It is not necessary for the private and company data to be transferred as it is being created. It may be stored locally in the electronic device 1 in its respective data store 7, 8 until a connection between the device 1 and the monitoring center 3 is available, or until it is time for the agent to initiate communication to or respond to the monitoring center 3.

While an embodiment has been described in relation to protecting private location data, the disclosed subject matter can equally be employed to protect other private data created using a shared business and private use device. Other private data that can be protected includes usage data, websites visited, video and audio files played, downloads, keystrokes, screenshots, emails, files and any other private data.

The present description is of the best presently contemplated mode of carrying out the subject matter disclosed and claimed herein. The description is made for the purpose of illustrating the general principles of the subject matter and not be taken in a limiting sense. The subject matter can find utility in a variety of implementations without departing from the scope of the disclosure made, as will be apparent to those of skill in the art from an understanding of the principles that underlie the subject matter.

We claim:

1. A method performed by a user computing device to enable data created on the user computer device ("created data") to be stored on a remote storage system with protection of user privacy, the method comprising:

receiving, over a network, a conditional data encryption rule that specifies criteria for the user computing device to selectively encrypt the created data with a private key of a user of the device before transmitting the created data to the remote storage system, said criteria including time-based criteria to determine which elements of the created data are to be selectively encrypted based at least in part on whether each element was created during employment work hours of a user, wherein the time-based criteria include an employment work schedule of the user;

storing the conditional data encryption rule in a memory of the user computing device;

during both employment work hours and non-work hours of the user, sending the created data to the remote storage system according to the conditional data encryption rule, wherein sending the created data comprises:

identifying a set of created data to send to the remote storage system;

determining, based at least partly on whether the set of created data was created during employment work hours associated with the user, as determined using the time-based criteria, whether to encrypt the set of created data with the private key;

when a determination is made based at least in part on the time-based criteria to encrypt the set of created data with the private key, encrypting the set of created data with the private key to generate privacy-protected data, and transmitting the privacy-protected data via a network to the remote storage system; and when a determination is made based at least in part on the time-based criteria not to encrypt the set of created data with the private key, transmitting the set of created data via the network to the remote storage system without first encrypting the set of created data with the private key;

wherein the method is performed under the control of program code executed by the user computing device.

2. The method of claim 1, wherein determining whether to encrypt the set of created data with the private key comprises comparing a creation day and time of the set of created data with the employment work schedule.

3. The method of claim 1, wherein the method is performed as a background task substantially invisibly to the user.

4. The method of claim 1, wherein the set of created data comprises a file.

5. The method of claim 1, wherein the set of created data comprises data created on the device by the user.

6. The method of claim 1, wherein the set of created data comprises location data reflective of a location of the device.

7. The method of claim 1, wherein the set of created data comprises a record of websites visited.

8. The method of claim 1, wherein the set of created data comprises an email message.

9. The method of claim 1, wherein the conditional data encryption rule is based in part on a vacation schedule of the user.

10. The method of claim 1, wherein the user computing device is owned by an employer of the user.

11. The method of claim 1, wherein the method is performed using a persistent agent installed on the device.

12. The method of claim 1, further comprising, when a determination is made based at least in part on the time-based criteria not to encrypt the set of created data with the private key of the user, encrypting the set of created data with an employer's key for said transmission to the remote storage system.

13. A non-transitory computer readable medium which stores program code that instructs a user computing device to perform a method that comprises:
    receiving over a network a conditional data encryption rule that specifies criteria for the user computing device to determine whether to encrypt data created on the device with a private key of a user of the device before transmitting said data to a remote storage system, said criteria including time-based criteria to determine which elements of the created data are to be selectively encrypted based at least in part on creation times of the elements and an employment work schedule of the user with an employer;
    storing the conditional data encryption rule in a memory of the user computing device;
    during both employment work hours and non-work hours of the user, sending the data to the remote storage system according to the conditional data encryption rule, wherein sending the data comprises:
        identifying a set of data to send to the remote storage system, said set of data created on the user computing device;
        determining, based at least partly on a schedule of work hours associated with the employer, as determined using the time-based criteria, whether the set of data is associated with an employment use of the user computing device;
        when a determination is made based at least in part on the time-based criteria that the set of data is not associated with an employment use of the device, encrypting the set of data with the private key of the user to generate privacy-protected data, and transmitting the privacy-protected data via a network to the remote storage system; and
        when a determination is made based at least in part on the time-based criteria that the set of data is associated with an employment use of the device, transmitting the set of data via the network to the remote storage system without first encrypting the set of data with the private key.

14. The non-transitory computer readable medium of claim 13, which stores further program code that instructs the user computing device to perform the method as a background task substantially invisibly to the user.

15. The non-transitory computer readable medium of claim 13, wherein the set of data comprises a file created on the device by the user.

16. The non-transitory computer readable medium of claim 13, wherein the method comprises, when a determination is made based at least in part on the time-based criteria that the set of data is associated with an employment use of the device, encrypting the set of data, for transmission to the remote storage system, with a key other than the private key of the user.

* * * * *